(12) United States Patent
Arai

(10) Patent No.: US 10,886,812 B2
(45) Date of Patent: Jan. 5, 2021

(54) STATOR AND MOTOR

(71) Applicant: FANUC CORPORATION, Yamanashi (JP)

(72) Inventor: Leo Arai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/142,154

(22) Filed: Sep. 26, 2018

(65) Prior Publication Data
US 2019/0109509 A1 Apr. 11, 2019

(30) Foreign Application Priority Data
Oct. 10, 2017 (JP) .................. 2017-196773

(51) Int. Cl.
H02K 5/12 (2006.01)
H02K 5/08 (2006.01)
H02K 5/10 (2006.01)
H02K 1/14 (2006.01)
H02K 1/18 (2006.01)
H02K 5/124 (2006.01)

(52) U.S. Cl.
CPC .............. H02K 5/08 (2013.01); H02K 1/14 (2013.01); H02K 1/18 (2013.01); H02K 5/10 (2013.01); H02K 1/146 (2013.01); H02K 5/124 (2013.01)

(58) Field of Classification Search
CPC ............................. H02K 1/14–18; H02K 5/10
USPC .......................................................... 310/88
See application file for complete search history.

(56) References Cited

U.S. PATENT DOCUMENTS 3,359,628 A   12/1967  Rutledge et al.
3,874,073 A *  4/1975  Dochterman ............ H02K 3/32
                                              29/598

(Continued)

FOREIGN PATENT DOCUMENTS

CN    1305257 A    7/2001
CN   102062106 A   5/2011

(Continued)

OTHER PUBLICATIONS

An Office Action mailed by the Japanese Patent Office dated Jun. 18, 2019, which corresponds to Japanese Patent Application No. 2017-196773 and is related to U.S. Appl. No. 16/142,154; with English language translation.

(Continued)

Primary Examiner — Alexander Talpalatski
(74) Attorney, Agent, or Firm — Studebaker & Brackett PC

(57) ABSTRACT

A stator of the present invention includes: a stator core; a front housing which is arranged on a front end portion side of the stator core; and a back housing which is arranged on a back end portion side of the stator core, where the stator further includes: a first sealant which is individually provided between the stator core and the front housing and between the stator core and the back housing; and a second sealant which is provided so as to coat the outer side of the stator core in a radial direction with the first sealant, and the first sealant and the second sealant are formed of the same curable resin integrally with each other. A motor of the present invention includes the stator and a rotor which is supported on the inner side of the stator such that the stator can be rotated with respect to the stator.

20 Claims, 3 Drawing Sheets

(56) References Cited

U.S. PATENT DOCUMENTS

| | | | |
|---|---|---|---|
| 4,496,866 A | 1/1985 | Yamamoto et al. | |
| 5,233,248 A * | 8/1993 | Kawamura | H02K 1/185 310/156.25 |
| 7,012,352 B2 * | 3/2006 | Fujita | H02K 3/522 310/239 |
| 7,015,619 B2 * | 3/2006 | Tanabe | H02K 1/146 310/254.1 |
| 9,876,414 B2 * | 1/2018 | Yoshida | H02K 5/1732 |
| 2006/0027260 A1 * | 2/2006 | LeCompte | C09K 9/00 136/243 |
| 2007/0069599 A1 * | 3/2007 | Mimura | H02K 5/08 310/91 |
| 2013/0249329 A1 * | 9/2013 | Yamada | H02K 3/50 310/43 |
| 2015/0229191 A1 * | 8/2015 | Yoshida | H02K 5/1732 310/43 |

FOREIGN PATENT DOCUMENTS

| | | |
|---|---|---|
| CN | 204205803 U | 3/2015 |
| CN | 104836363 A | 8/2015 |
| CN | 104919290 A | 9/2015 |
| DE | 10 2016 202 463 A1 | 8/2016 |
| DE | 10 2015 207 865 A1 | 11/2016 |
| JP | S60-170437 A | 9/1985 |
| JP | H09-163641 A | 6/1997 |
| JP | H10-112954 A | 4/1998 |

OTHER PUBLICATIONS

An Office Action mailed by the State Intellectual Property Office of the People's Republic of China dated Jan. 22, 2020, which corresponds to Chinese Patent Application No. 201811141435.2 and is related to U.S. Appl. No. 16/142,154; with English language translation.

Synthetic resin (Material); Wikipedia; Jun. 29, 2020; URL: https://de.wikipedia.org/wiki/Harz_(Material)#Kunstharz; total 8 pages; [retrieved on Oct. 20, 2020].

An Office Action issued by the German Patent Office dated Oct. 21, 2020, which corresponds to German Patent Application No. 102018007629.7 and is related to U.S. Appl. No. 16/142,154.

\* cited by examiner

STATOR AND MOTOR

This application is based on and claims the benefit of priority from Japanese Patent Application No. 2017-196773, filed on 10 Oct. 2017, the content of which is incorporated herein by reference.

BACKGROUND OF THE INVENTION

Field of the Invention

The present invention relates to a stator and a motor.

Related Art

In a motor, a stator is provided in which a front housing and a back housing are respectively attached to a front end portion side and a back end portion side of a stator core, and the outer circumference of the stator is exposed to the outside (see, for example, patent documents 1 and 2). In the motor described above, depending on the application, a high waterproof property and high airtightness are required. In particular, when a motor is attached to a machine tool using a cutting fluid, since the cutting fluid is highly permeable, it is necessary to acquire high levels of the performance thereof.

Patent document 1 discloses a technology in which the stator core of a motor is impregnated with an anaerobic adhesive. Patent document 2 discloses a technology in which O-rings are provided between a front housing and a back housing and a stator core. However, all these technologies are not necessarily satisfactory in terms of a waterproof property and airtightness.

Hence, motors 100, 110 and 120 shown in FIGS. 3 to 5 are also considered. In the motor 100 shown in FIG. 3, a cylindrical jacket 300 is provided so as to wrap the outer side of a stator core 200 in a radial direction. The jacket 300 is arranged between a front housing 201 attached to a front end surface side of the stator core 200 and a back housing 202 attached to a back end surface side of the stator core 200. Both between the jacket 300 and the front housing 201 and between the jacket 300 and the back housing 202, gaskets 400 formed with a sealant, an O-ring or the like are provided.

In the motor 110 shown in FIG. 4, a surface sealant 500 is applied and formed so as to coat the outer side of a stator core 200 in a radial direction. The surface sealant 500 is formed so as to coat both a boundary portion 203 between the stator core 200 and a front housing 201 and a boundary portion 204 between the stator core 200 and a back housing 202.

In the motor 120 shown in FIG. 5, in addition to a surface sealant 500 which is applied and formed so as to coat the outer side of a stator core 200 in a radial direction, a different type of sealant 600 from the surface sealant 500 is provided both between the stator core 200 and a front housing 201 and between the stator core 200 and a back housing 202. The surface sealant 500 is formed so as to coat the sealant 600.

Patent Document 1: Japanese Unexamined Patent Application, Publication No. H09-163641

Patent Document 2: Japanese Unexamined Patent Application, Publication No. H10-112954

SUMMARY OF THE INVENTION

In the case of the motor 100 shown in FIG. 3, since the jacket 300 needs to be produced separately, the cost is disadvantageously increased.

In the case of the motor 110 shown in FIG. 4, since the stator core 200 is only coated with the surface sealant 500, the boundary portions 203 and 204 are inferior in waterproof property and airtightness, and in particular, the protection of a cutting fluid which is highly permeable is not sufficient.

By contrast, in the case of the motor 120 shown in FIG. 5, since parts between the stator core 200 and the front housing 201 and the back housing 202 and the outer circumference of the stator core 200 can be sealed, it can be considered that as compared with the motor 110 shown in FIG. 4, it is possible to acquire a waterproof property and airtightness. However, when as the sealant 600, a part, such as an O-ring, whose shape is fixed is used, it is necessary to form a storage space for the O-ring both in the front housing 201 and the back housing 202, with the result that not only the cost of the O-ring but also the processing cost of the storage space for the O-ring is disadvantageously needed. As a fundamental problem, it may be impossible to acquire the storage space.

On the other hand, in the motor 120 shown in FIG. 5, when as the sealant 600, for example, a sealant such as a liquid gasket is used, it is not necessary to process the storage space unlike the case of the use of the O-ring, with the result that the cost is unlikely to be increased. However, when after the application of a liquid sealant, the front housing 201 and the back housing 202 are bonded to the stator core 200, the sealant is disadvantageously forced out. In this case, the forced out sealant is removed such as by being wiped away in each case, and thereafter the surface sealant 500 needs to be applied, with the result that the manufacturing process is complicated.

When the surface sealant 500 is formed without the forced out sealant 600 being removed, after the sealant 600 is sufficiently cured, the surface sealant 500 needs to be applied. Moreover, in such a case, the adhesion (compatibility) of the surface sealant 500 and the sealant 600 needs to be previously evaluated. If the adhesion of both the sealants 500 and 600 is poor, when they makes contact with a highly permeable cutting fluid, the cutting fluid may infiltrate through a boundary between the surface sealant 500 and the sealant 600. Hence, it is necessary to pay close attention to the formation of both the sealants 500 and 600, and thus the manufacturing process is complicated.

Hence, an object of the present invention is to provide a stator and a motor in which it is unlikely that the manufacturing process is complicated and that the cost is increased and in which it is possible to acquire a high waterproof property and high airtightness.

(1) A stator (for example, a stator 1 which will be described later) according to the present invention includes: a stator core (for example, a stator core 11 which will be described later); a front housing (for example, a front housing 12 which will be described later) which is arranged on a front end portion side of the stator core; and a back housing (for example, a back housing 13 which will be described later) which is arranged on a back end portion side of the stator core, where the stator further includes: a first sealant (for example, a first sealant 6a, 6b which will be described later) which is individually provided between the stator core and the front housing and between the stator core and the back housing; and a second sealant (for example, a second sealant 7 which will be described later) which is provided so as to coat the outer side of the stator core in a radial direction with the first sealant, and the first sealant and the second sealant are formed of the same curable resin integrally with each other.

(2) Preferably, in the motor described in (1), the curable resin is formed of a hybrid resin of an acrylic resin and an epoxy resin.

(3) Preferably, in the motor described in (1) or (2), the curable resin has anaerobic curability and active energy ray curability.

(4) Preferably, in the motor described in (1) or (2), the curable resin has thermosetting curability and active energy ray curability.

(5) A motor (for example, a motor 10 which will be described later) according to the present invention includes: the stator according to any one of (1) to (4); and a rotor (for example, a rotor 2 which will be described later) which is supported on the inner side of the stator such that the rotor can be rotated with respect to the stator.

According to the present invention, it is possible to provide a stator and a motor in which it is unlikely that the manufacturing process is complicated and that the cost is increased and in which it is possible to acquire a high waterproof property and high airtightness.

DETAILED DESCRIPTION OF THE INVENTION

Figure 1:
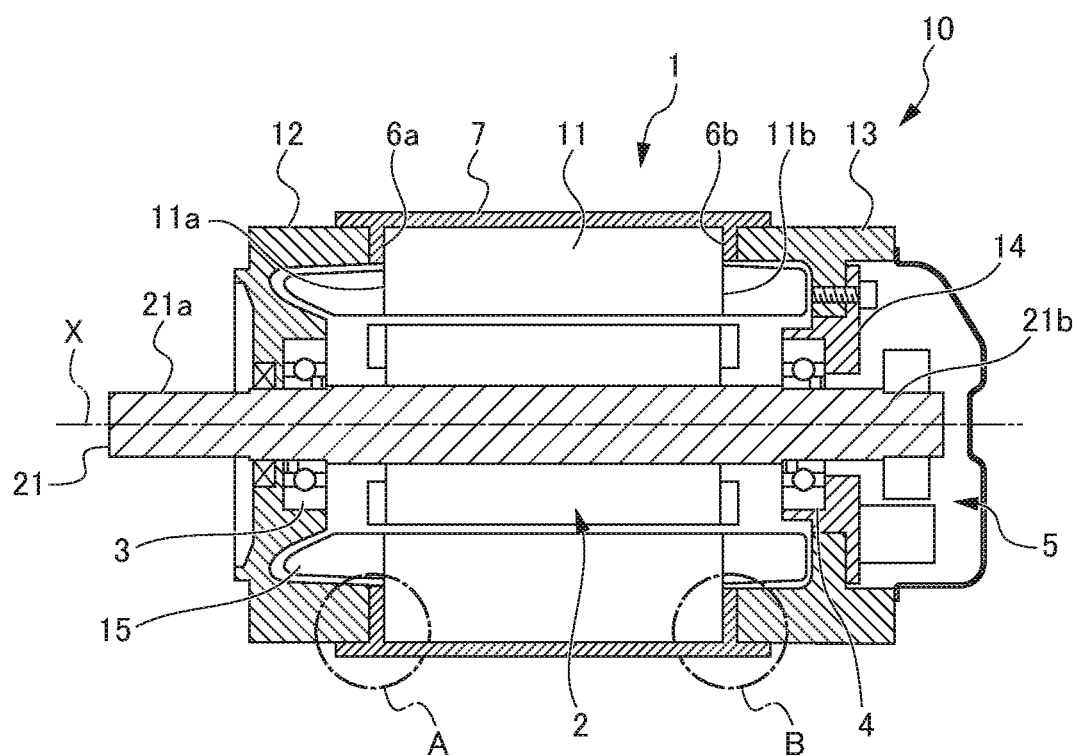
FIG. 1 is a vertical cross-sectional view schematically showing a motor according to an embodiment of the present invention.
Figure 2A:
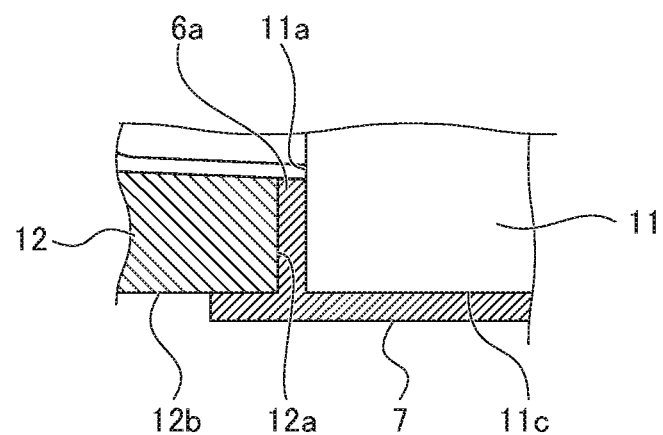
FIG. 2A is an enlarged view of an A part in FIG. 1.
Figure 2B:
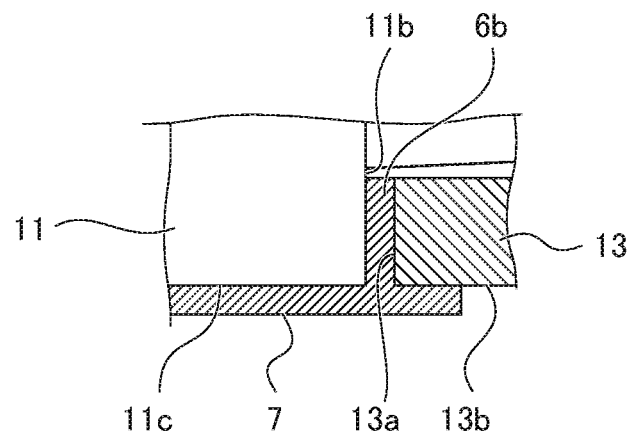
FIG. 2B is an enlarged view of a B part in FIG. 1.
Figure 3:
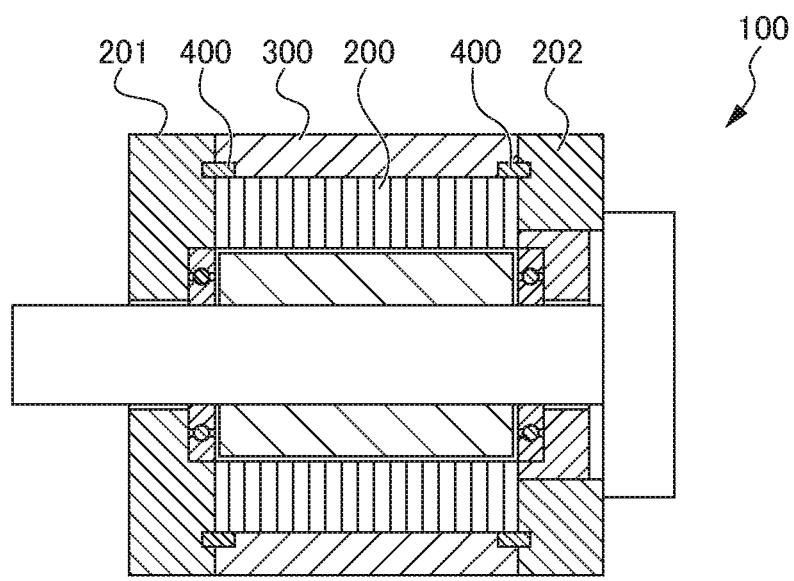
FIG. 3 is a vertical cross-sectional view schematically showing an example of a conventional motor.
Figure 4:
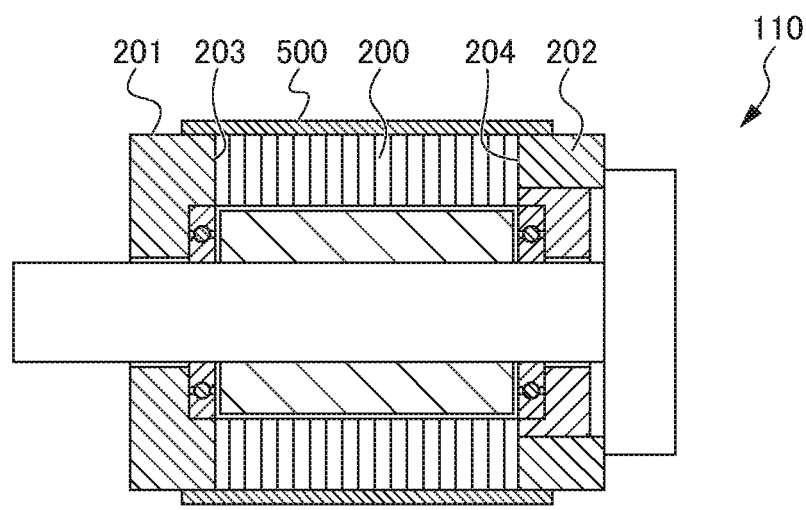
FIG. 4 is a vertical cross-sectional view schematically showing another example of the conventional motor.
Figure 5:
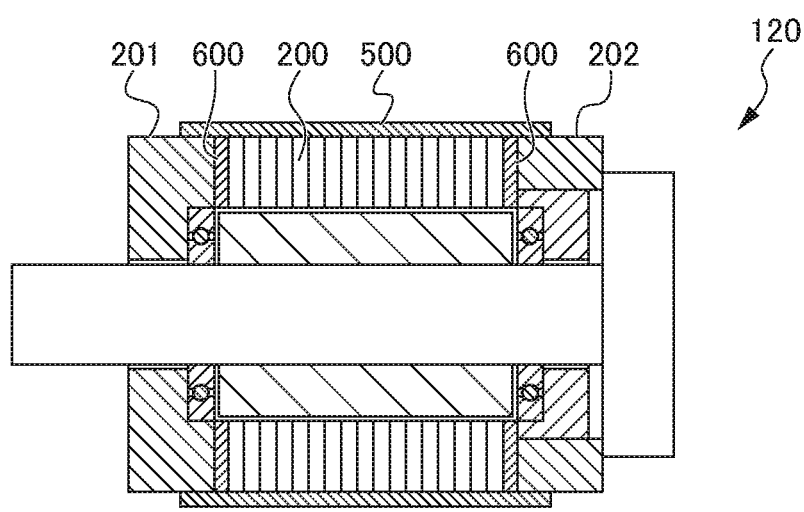
FIG. 5 is a vertical cross-sectional view schematically showing yet another example of the conventional motor.

An embodiment of the present invention will be described below with reference to drawings. FIG. 1 is a vertical cross-sectional view schematically showing a motor according to the embodiment of the present invention. FIG. 2A is an enlarged view of an A part in FIG. 1. FIG. 2B is an enlarged view of a B part in FIG. 1. The motor 10 includes, as a main configuration, a stator 1, a rotor 2, an output axis side bearing 3, an anti-output axis side bearing 4 and a detector 5.

The stator 1 is formed with: a stator core 11; a front housing 12 which is provided on a front end portion side (left end portion side in FIG. 1) of the stator core 11; and a back housing 13 which is provided on a back end portion side (right end portion side in FIG. 1) of the stator core 11.

The rotor 2 is supported by the output axis side bearing 3 and the anti-output axis side bearing 4 within the stator 1. Specifically, the rotor 2 includes a rotary axis 21. The rotary axis 21 is supported at both end portions thereof with the output axis side bearing 3 and the anti-output axis side bearing 4, and is supported such that the rotary axis 21 can be rotated about a rotary axis line X. The rotor 2 is rotated about the rotary axis line X integrally with the rotary axis 21. The anti-output axis side bearing 4 is supported by a support ring 14 which is screwed to the back housing 13.

In the rotary axis 21 of the rotor 2, a front end 21a which is located at an end portion in the direction of the side of the output axis side bearing 3 is protruded from the front housing 12. In the rotary axis 21 of the rotor 2, a back end 21b which is located at an end portion in the direction of the side of the anti-output axis side bearing 4 is protruded from the support ring 14 provided in the back housing 13. In the back end 21b, the detector 5 for detecting the rotation position and the rotation speed and the like of the rotary axis 21 is provided. The detector 5 is formed with, for example, an encoder.

The stator core 11 of the stator 1 is a member which surrounds the rotor 2. Specifically, the stator core 11 is a substantially cylindrical member which is extended along the rotary axis line X so as to surround the rotor 2. The stator core 11 is formed with a large number of electromagnetic steel plates stacked in layers, and includes a front end surface 11a located at an end portion on the side of the output axis side bearing 3 and a back end surface 11b located at an end portion on the side of the anti-output axis side bearing 4. A winding 15 is wound on a protrusion portion (not shown) formed on the inner circumferential surface of the stator core 11.

The winding 15 is fixed to the stator core 11 with a resin or the like. The winding 15 is extended along the rotary axis line X so as to protrude from both ends of the stator core 11. A lead wire (not shown) is connected to the winding 15. The winding 15 generates a rotary magnetic field by a current supplied through the lead wire. The rotor 2 is rotated integrally with the rotary axis 21 according to the rotary magnetic field generated by the stator core 11.

The front housing 12 and the back housing 13 surround the winding 15 which is protruded from the stator core 11. The front housing 12 is extended from the front end surface 11a of the stator core 11 toward the front end 21a of the rotary axis 21 so as to surround part of the rotary axis 21 and the output axis side bearing 3. The output axis side bearing 3 is supported by the front housing 12. The front end 21a of the rotary axis 21 protruded from the front housing 12 acts as an output axis which is directly or indirectly coupled to, for example, the spindle of a machine tool.

The back housing 13 is extended from the back end surface 11b of the stator core 11 toward the back end 21b of the rotary axis 21 so as to surround part of the rotary axis 21 and the anti-output axis side bearing 4. The anti-output axis side bearing 4 is supported by the back housing 13.

The front housing 12 and the back housing 13 are fixed integrally to the stator core 11 with a long screw (not shown) which penetrates the stator core 11 from the front housing 12 and which is screwed to the back housing 13. The long screw may penetrate the stator core 11 from the back housing 13 and be screwed to the front housing 12.

In the stator 1 of the motor 10, between the stator core 11 and the front housing 12 and between the stator core 11 and the back housing 13, first sealants 6a and 6b are individually provided.

Specifically, as shown in FIG. 2A, the first sealant 6a is interposed between the front end surface 11a of the stator core 11 and the back end surface 12a of the front housing 12, and is tightly adhered to the front end surface 11a of the stator core 11 and the back end surface 12a of the front housing 12. The part between the stator core 11 and the front housing 12 is sealed with the first sealant 6a in an airtight and watertight manner.

As shown in FIG. 2B, the first sealant 6b is interposed between the back end surface 11b of the stator core 11 and the front end surface 13a of the back housing 13, and is tightly adhered to the back end surface 11b of the stator core 11 and the front end surface 13a of the back housing 13. The part between the stator core 11 and the back housing 13 is sealed with the first sealant 6b in an airtight and watertight manner.

The first sealants 6a and 6b are applied between the front end surface 11a of the stator core 11 and the back end surface 12a of the front housing 12 and between the back end surface 11b of the stator core 11 and the front end surface 13a of the back housing 13, and are thereafter compressed by attaching the front housing 12 and the back housing 13, and thus they are actually formed so as to be extremely thin. However, in FIGS. 1, 2A and 2B, for ease of understanding of the invention, the first sealants 6a and 6b are shown to be thicker.

The first sealants 6a and 6b are obtained by curing coating layers formed by applying a curable resin both between the front end surface 11a of the stator core 11 and the back end surface 12a of the front housing 12 and between the back end surface 11b of the stator core 11 and the front end surface 13a of the back housing 13.

On the other hand, on the outer side of the stator core 11 in a radial direction, a second sealant 7 is provided. As shown in FIGS. 2A and 2B, the second sealant 7 is tightly adhered to the outer circumferential surface 11c of the stator core 11 exposed between the front housing 12 and the back housing 13 in the stator 1 so as to coat the entire outer circumferential surface 11c. Part of the second sealant 7 permeates between the electromagnetic steel plates of the stator core 11. The second sealant 7 is obtained by curing a coating layer formed integrally by applying the same curable resin as the first sealants 6a and 6b.

The second sealant 7 is extended in a forward/backward direction so as to reach both a halfway portion of the outer circumferential surface 12b of the front housing 12 and a halfway portion of the outer circumferential surface 13b of the back housing 13 so as to be also tightly adhered to the outer circumferential surface 12b of the front housing 12 and the outer circumferential surface 13b of the back housing 13. Hence, between the front housing 12 of the stator core 11 and the back housing 13 of the stator core 11, the second sealant 7 is connected to the first sealants 6a and 6b and formed integrally therewith so as to coat the outer side of the first sealants 6a and 6b in the radial direction.

The first sealants 6a and 6b and the second sealant 7 are formed of the same curable resin, and thus as shown in FIGS. 2A and 2B, in parts where the first sealants 6a and 6b and the second sealant 7 are connected together, both of them are integral, with the result that one integral sealant made of the common curable resin as a whole is formed. The first sealants 6a and 6b and the second sealant 7 are significantly tightly adhered so as to be formed integrally, and thus the airtightness and the waterproof property of the parts where both of them are formed integrally are enhanced. Hence, in the motor 10, even when the cutting fluid makes contact with the sealants, there is almost no possibility that the cutting fluid permeates into the stator 1 from between the first sealants 6a and 6b and the second sealant 7.

Since the first sealants 6a and 6b and the second sealant 7 are formed of the same curable resin, when after the first sealants 6a and 6b are applied and formed, the second sealant 7 is applied and formed so as to coat the first sealants 6a and 6b, the uncured first sealants 6a and 6b which are forced out between the stator core 11 and the front housing 12 and between the stator core 11 and the back housing 13 do not need to be removed such as by being wiped away. Since it is not necessary to consider the adhesion (compatibility) of the first sealants 6a and 6b and the second sealant 7, it is possible to apply and form the second sealant 7 immediately after the first sealants 6a and 6b are applied and formed. Hence, in the motor 10, it is unlikely that the manufacturing process is complicated. In the motor 10, unlike the conventional manner, it is not necessary that the stator core 11 be coated with a jacket and that storage spaces for the sealants be processed in the front housing 12 and the back housing 13, with the result that the cost is unlikely to be increased.

[Curable Resin]

Although the curable resin used for the first sealants 6a and 6b and the second sealant 7 is not particularly limited, for example, a hybrid resin in which an acrylic resin and an epoxy resin are compounded can be used. In this way, it is possible to obtain the following effects. Specifically, in general, an iron material is used for the stator core 11 of the motor 10 whereas a light-weight aluminum material is often used for the front housing 12 and the back housing 13. In this way, onto the first sealants 6a and 6b interposed therebetween, a stress load caused by a difference in thermal expansion coefficient between the different materials thereof is applied, and thus flexibility for maintaining the waterproof property and the airtightness so as to cope with this stress load is required. On the other hand, although in the second sealant 7, there is no problem on such a stress load, with consideration given to chemical resistance when the second sealant 7 makes contact with the cutting fluid or the like, a certain degree of hardness is required. In an epoxy resin, a hard resin layer is formed, chemical resistance is high and in particular, resistance to a cutting fluid is high. On the other hand, an acrylic resin is flexible as compared with the epoxy resin. Hence, a hybrid resin thereof is used, and thus even when the curable resin common to the first sealants 6a and 6b and the second sealant 7 is used, contradictory purposes of coping with the stress load and establishing chemical resistance can be simultaneously achieved.

Although the acrylic resin is not particularly limited, in terms of satisfactory flexibility, a urethane modified acrylate can be used.

The curable resin is classified into a thermo-set, an anaerobic curable resin, an active energy ray curable resin and a moisture curable resin according to differences in the method of starting a curing reaction (polymerization). The thermo-set is a resin which is cured by starting polymerization by heating. The anaerobic curable resin is a resin which is cured by starting polymerization by interruption of oxygen. The active energy ray curable resin is a resin which is cured by starting polymerization by application of light energy rays such as visible light, ultraviolet rays, infrared rays, X rays, a rays, R rays, y rays or an electron beam. The moisture curable resin is a resin which is cured by starting polymerization by moisture in air. In the present invention, the curable resin which is cured by any one of the methods described above can be used.

The curable resin of the present invention is not limited to a curable resin which is cured by only one of the types of methods described above, and may be cured by any two of the types of methods. Although there is no particular limitation, as preferred examples, a curable resin which has anaerobic curability and active energy ray curability and a curable resin which has thermosetting curability and active energy ray curability can be mentioned.

When the curable resin used for the first sealants 6a and 6b and the second sealant 7 has anaerobic curability and active energy ray curability, the following effects are obtained. Specifically, the first sealants 6a and 6b are individually applied between the stator core 11 and the front housing 12 and between the stator core 11 and the back housing 13, and thus active energy rays do not enter deeply, with the result that it is difficult to sufficiently cure the first sealants 6a and 6b. However, since the first sealants 6a and 6b also have anaerobic curability, they are brought into an anaerobic state between the stator core 11 and the front housing 12 and between the stator core 11 and the back housing 13 so as to be cured whereas the second sealant 7 is cured by application of active energy rays. In this way, after the application of the first sealants 6a and 6b, it is not necessary to perform an operation for curing them, and thus it is possible to cure the second sealant 7 immediately after the second sealant 7 is applied and formed, with the result that the assembly of the motor 10 is satisfactory.

When the curable resin used for the first sealants 6a and 6b and the second sealant 7 has thermosetting curability and active energy ray curability, it is also possible to obtain the effect of achieving the satisfactory assembly of the motor 10. Specifically, after the first sealants 6a and 6b are applied and formed between the stator core 11 and the front housing 12 and between the stator core 11 and the back housing 13, the second sealant 7 is applied and formed, and the second sealant 7 is cured by application of active energy rays. The first sealants 6a and 6b are preferably cured by heating after the second sealant 7 is cured.

In either of the cases described above, immediately after the second sealant 7 is applied and formed, the second sealant 7 can be cured, and thus the handleability of the motor 10 is thereafter satisfactory. As the specific active energy rays, in terms of economy and workability, ultraviolet rays are preferable.

EXPLANATION OF REFERENCE NUMERALS

10 motor
1 stator
11 stator core
12 front housing
13 back housing
2 rotor
6a, 6b first sealant
7 second sealant

What is claimed is:

1. A stator comprising: a stator core; a front housing which is arranged on a front end portion side of the stator core; and a back housing which is arranged on a back end portion side of the stator core,
   wherein the stator further comprises: a first sealant which is individually provided between the stator core and the front housing and between the stator core and the back housing; and
   a second sealant which is provided so as to individually coat an outer side of the stator core in a radial direction with the first sealant and coat an entire outer circumferential surface of the stator core,
   the first sealant and the second sealant are formed of a same curable resin integrally with each other, and
   all three of the outer circumferential surface of the stator core, an outer circumferential surface of the front housing, and an outer circumferential surface of the back housing are aligned with each other when viewed in a direction parallel to a longitudinal axis of a rotor of the stator core.

2. The stator according to claim 1, wherein the curable resin is formed of a hybrid resin of an acrylic resin and an epoxy resin.

3. The stator according to claim 1, wherein the curable resin has anaerobic curability and active energy ray curability.

4. The stator according to claim 1, wherein the curable resin has thermosetting curability and active energy ray curability.

5. A motor comprising:
   the stator according to claim 1; and
   the rotor, which is supported on an inner side of the stator such that the rotor can be rotated with respect to the stator.

6. A stator comprising: a stator core; a front housing which is arranged on a front end portion side of the stator core; and a back housing which is arranged on a back end portion side of the stator core,
   wherein the stator further comprises: a first sealant which is individually provided between the stator core and the front housing and between the stator core and the back housing; and
   a second sealant which is provided so as to individually coat an outer side of the stator core in a radial direction with the first sealant and coat an entire outer circumferential surface of the stator core,
   the first sealant and the second sealant are formed of a same curable resin integrally with each other,
   a first part of the first sealant is between a front end surface of the stator core and a back end surface of the front housing when viewed in a direction parallel to a longitudinal axis of a rotor of the stator core,
   a second part of the first sealant is between a back end surface of the stator core and a front end surface of the back housing when viewed in the direction parallel to the longitudinal axis of the rotor,
   the front end surface of the stator core and the back end surface of the front housing at least partially overlap when viewed in the direction parallel to the longitudinal axis of the rotor, and
   the back end surface of the stator core and the front end surface of the back housing at least partially overlap when viewed in the direction parallel to the longitudinal axis of the rotor.

7. The stator according to claim 6, wherein the first part of the first sealant is compressed in the direction parallel to the longitudinal axis of the rotor by the front end surface of the stator core and the back end surface of the front housing.

8. The stator according to claim 1, wherein the second sealant at least partially overlaps an outermost circumferential surface of the back housing when viewed in a radial direction of the back housing.

9. A stator comprising: a stator core;
   a front housing which is arranged on a front end portion side of the stator core; and a back housing which is arranged on a back end portion side of the stator core,
   wherein the stator further comprises: a first sealant which is individually provided between the stator core and the front housing and between the stator core and the back housing; and
   a second sealant which is provided so as to individually coat an outer side of the stator core in a radial direction with the first sealant and coat an entire outer circumferential surface of the stator core,
   the first sealant and the second sealant are formed of a same curable resin integrally with each other, and
   the first sealant adheres to a front end surface of the stator core, a back end surface of the stator core, a front end surface of the back housing, and a back end surface of the front housing and all four of the front end surface of the stator core, the back end surface of the stator core, the front end surface of the back housing, and the back end surface of the front housing are aligned with each other when viewed in a direction parallel to a longitudinal axis of a rotor of the stator core.

10. The stator according to claim 6, wherein the curable resin is formed of a hybrid resin of an acrylic resin and an epoxy resin.

11. The stator according to claim 6, wherein the curable resin has anaerobic curability and active energy ray curability.

12. The stator according to claim 6, wherein the curable resin has thermosetting curability and active energy ray curability.

13. A motor comprising:
the stator according to claim 6; and
the rotor, which is supported on an inner side of the stator such that the rotor can be rotated with respect to the stator.

14. The stator according to claim 6, wherein all three of the outer circumferential surface of the stator core, an outer circumferential surface of the front housing, and an outer circumferential surface of the back housing are aligned with each other when viewed in the direction parallel to the longitudinal axis of the rotor of the stator core.

15. The stator according to claim 9, wherein the curable resin is formed of a hybrid resin of an acrylic resin and an epoxy resin.

16. The stator according to claim 9, wherein the curable resin has anaerobic curability and active energy ray curability.

17. The stator according to claim 9, wherein the curable resin has thermosetting curability and active energy ray curability.

18. A motor comprising:
the stator according to claim 9; and
the rotor, which is supported on an inner side of the stator such that the rotor can be rotated with respect to the stator.

19. The stator according to claim 9, wherein all three of the outer circumferential surface of the stator core, an outer circumferential surface of the front housing, and an outer circumferential surface of the back housing are aligned with each other when viewed in the direction parallel to the longitudinal axis of the rotor of the stator core.

20. The stator according to claim 9, wherein,
a first part of the first sealant is between the front end surface of the stator core and the back end surface of the front housing when viewed in the direction parallel to the longitudinal axis of the rotor of the stator core,
a second part of the first sealant is between the back end surface of the stator core and the front end surface of the back housing when viewed in the direction parallel to the longitudinal axis of the rotor,
the front end surface of the stator core and the back end surface of the front housing at least partially overlap when viewed in the direction parallel to the longitudinal axis of the rotor, and
the back end surface of the stator core and the front end surface of the back housing at least partially overlap when viewed in the direction parallel to the longitudinal axis of the rotor.

\* \* \* \* \*